(12) United States Patent
Terry et al.

(10) Patent No.: US 10,771,992 B2
(45) Date of Patent: Sep. 8, 2020

(54) METRICS USING PARAMETERS FOR MULTIPLE RADIO CONFIGURATIONS

(71) Applicant: AIRSPAN NETWORKS INC., Boca Raton, FL (US)

(72) Inventors: Kevin Andrew Terry, Devon (GB); Anthony Edward Putman, Chippenham (GB); Alan Carter, Bath (GB)

(*) Notice: Subject to any disclaimer, the term of this patent is extended or adjusted under 35 U.S.C. 154(b) by 7 days.

(21) Appl. No.: 16/122,543

(22) Filed: Sep. 5, 2018

(65) Prior Publication Data
US 2019/0116512 A1 Apr. 18, 2019

(30) Foreign Application Priority Data
Oct. 12, 2017 (GB) .................................. 1716673.7

(51) Int. Cl.
*H04W 24/08* (2009.01)
*H04W 48/20* (2009.01)
(Continued)

(52) U.S. Cl.
CPC ........... *H04W 24/08* (2013.01); *H04W 48/20* (2013.01); *H04W 84/047* (2013.01); *H04W 84/12* (2013.01); *H04W 88/04* (2013.01)

(58) Field of Classification Search
CPC ..... H04W 24/08; H04W 48/20; H04W 88/10; H04W 36/30; H04B 17/318
See application file for complete search history.

(56) References Cited

U.S. PATENT DOCUMENTS 6,215,442 B1\* 4/2001 Sheynblat ............. G01S 5/0009
342/357.25
9,001,767 B1 4/2015 Gatewood et al.
(Continued)

FOREIGN PATENT DOCUMENTS

EP 677940 A2 10/1995
EP 2664174 A2 11/2013
(Continued)

OTHER PUBLICATIONS

GB Search Report in GB1716673.7 dated Mar. 23, 2018, 4 pages.
PCT Search Report and Written Opinion in PCT/GB2018/052509 dated Oct. 30, 2018, 16 pages.

*Primary Examiner* — Mohammad S Anwar
(74) *Attorney, Agent, or Firm* — Haynes Beffel & Wolfeld LLP; Andrew L. Dunlap

(57) ABSTRACT

There is provided a node that includes radio circuitry that wirelessly connects to other devices in a wireless network using either a first radio configuration or a second radio configuration. Scan circuitry determines a first measurement related to using the radio circuitry to connect to an analysed device in the other devices in the first radio configuration and a second measurement related to using the radio circuitry to connect to the analysed device in the second radio configuration. Metric calculation circuitry calculates, for each device in the other devices, a metric, wherein each metric is calculated by applying a first weighting greater than zero to the first measurement obtained for that device and a second weighting greater than zero to the second measurement obtained for that device. Selection circuitry adapted to select one of the other devices in dependence on the metric calculated for each of the other devices.

20 Claims, 6 Drawing Sheets

(51) Int. Cl.
  *H04W 88/04* (2009.01)
  *H04W 84/04* (2009.01)
  *H04W 84/12* (2009.01)

(56) References Cited

U.S. PATENT DOCUMENTS

| | | | |
|---|---|---|---|
| 2011/0154145 A1* | 6/2011 | Lomnitz | H04L 1/0002 |
| | | | 714/749 |
| 2011/0243020 A1* | 10/2011 | Ponnuswamy | H04L 41/22 |
| | | | 370/252 |
| 2013/0260757 A1* | 10/2013 | Deivasigamani | H04W 24/00 |
| | | | 455/435.3 |
| 2016/0262077 A1 | 9/2016 | Zhang et al. | |
| 2016/0380350 A1 | 12/2016 | Elson et al. | |
| 2017/0126363 A1* | 5/2017 | Wang | H04L 1/0061 |
| 2017/0331185 A1* | 11/2017 | Wilken | H01Q 3/10 |

FOREIGN PATENT DOCUMENTS

| | | |
|---|---|---|
| EP | 2999287 A1 | 3/2016 |
| EP | 3082362 A1 | 10/2016 |
| GB | 2539733 A | 12/2016 |
| WO | 2008122754 A1 | 10/2008 |

\* cited by examiner

| Reading | SINR | RSRP | y[n] SINR | y[n] RSRP | Normalised SINR | Normalised RSRP | Weighted N SINR | Weighted N RSRP | DRM |
|---|---|---|---|---|---|---|---|---|---|
| 1 | -2 | -103 | -2 | -103 | | | | | |
| 2 | 5 | -105 | -0.31 | -103.48 | | | | | |
| 3 | 7 | -104 | 1.46 | -103.61 | | | | | |
| 4 | 6 | -103 | 2.56 | -103.46 | | | | | |
| 5 | 1 | -103 | 2.18 | -103.35 | 0.205 | 0.333 | 0.062 | 0.233 | 0.295 | num_samples = 5
settling_level = 0.75
alpha = 1 - 0.25^0.2 = 0.2421
1 - alpha = 0.7579
SINR Min = -5
SINR Max = 30
RSRP Min = -130
RSRP Max = -50
SINR Weight = 0.3
RSRP Weight = 0.7

FIG. 3

| Angle | Band 1 DRM | FirstWeighting | Band 2 DRM | SecondWeighting | MinDRMOffset | GPSDetection | Result |
|---|---|---|---|---|---|---|---|
| 50 | 0.7 | 1 | 0.7 | 0.75 | 0.4 | 1 | 0.925 |
| 110 | 0.6 | 1 | 0.1 | 0.75 | 0.4 | 1 | 0.6 |
| 145 | 0.55 | 1 | 0.5 | 0.75 | 0.4 | 1 | 0.625 |
| 220 | 0.8 | 1 | 0.5 | 0.75 | 0.4 | 1 | 0.875 |
| 355 | 0.7 | 1 | 1 | 0.75 | 0.4 | 0 | 0.7 |

FIG. 5

METRICS USING PARAMETERS FOR MULTIPLE RADIO CONFIGURATIONS

The present technique relates to metrics such as metrics that consider parameters for multiple radio configurations.

In a wireless network, a relay node is often provided to enable connectivity between, for example, user equipment (UE) and a base station (eNodeB). Previously proposed techniques for establishing connectivity between any pair of devices typically involves one of the devices scanning for candidates using one or more wireless bands. The scanning process will make one or more measurements of the current capability of each candidate. A metric is then applied in order to combine these metrics and thereby arrive at a conclusion as to which candidate is the most appropriate for which to establish a connection. A limiting factor in this process, however, is that if the conditions (e.g. if one of the wireless bands becomes unusable) then the entire scanning process must begin again. This process is time consuming, can consume significant energy, often results in downtime for the device and is generally best avoided.

Viewed from a first example configuration, there is provided a node comprising radio circuitry adapted to wirelessly connect to other devices in a wireless network using either a first radio configuration or a second radio configuration; scan circuitry adapted to determine a first measurement related to using the radio circuitry to connect to an analysed device in the other devices in the first radio configuration and a second measurement related to using the radio circuitry to connect to the analysed device in the second radio configuration; metric calculation circuitry adapted to calculate, for each device in the other devices, a metric, wherein each metric is calculated by applying a first weighting greater than zero to the first measurement obtained for that device and a second weighting greater than zero to the second measurement obtained for that device; and selection circuitry adapted to select one of the other devices in dependence on the metric calculated for each of the other devices.

Viewed from a second example configuration there is provided a method comprising: wirelessly connecting to other devices in a wireless network using either a first radio configuration or a second radio configuration determining a first measurement related to connecting to an analysed device in the other devices in the first radio configuration and a second measurement related to connecting to the analysed device in the second radio configuration; calculating, for each device in the other devices, a metric, by applying a first weighting greater than zero to the first measurement obtained for that device and a second weighting greater than zero to the second measurement obtained for that device; and selecting one of the other devices in dependence on the metric calculated for each of the other devices.

Viewed from a third example configuration, there is provided a node comprising: means for wirelessly connecting to other devices in a wireless network using either a first radio configuration or a second radio configuration means for determining a first measurement related to connecting to an analysed device in the other devices in the first radio configuration and a second measurement related to connecting to the analysed device in the second radio configuration; means for calculating, for each device in the other devices, a metric, by applying a first weighting greater than zero to the first measurement obtained for that device and a second weighting greater than zero to the second measurement obtained for that device; and means for selecting one of the other devices in dependence on the metric calculated for each of the other devices.

The present technique will be described further, by way of example only, with reference to embodiments thereof as illustrated in the accompanying drawings, in which:

FIG. 1 illustrates a wireless network 100 in accordance with some embodiments;

FIG. 2 schematically illustrates a node 120 in more detail in accordance with some embodiments;

FIG. 3 shows a worked example of calculating DRM in accordance with some embodiments;

FIG. 5 shows a worked example for the calculation of the metric in accordance with some embodiments.

Figure 1:
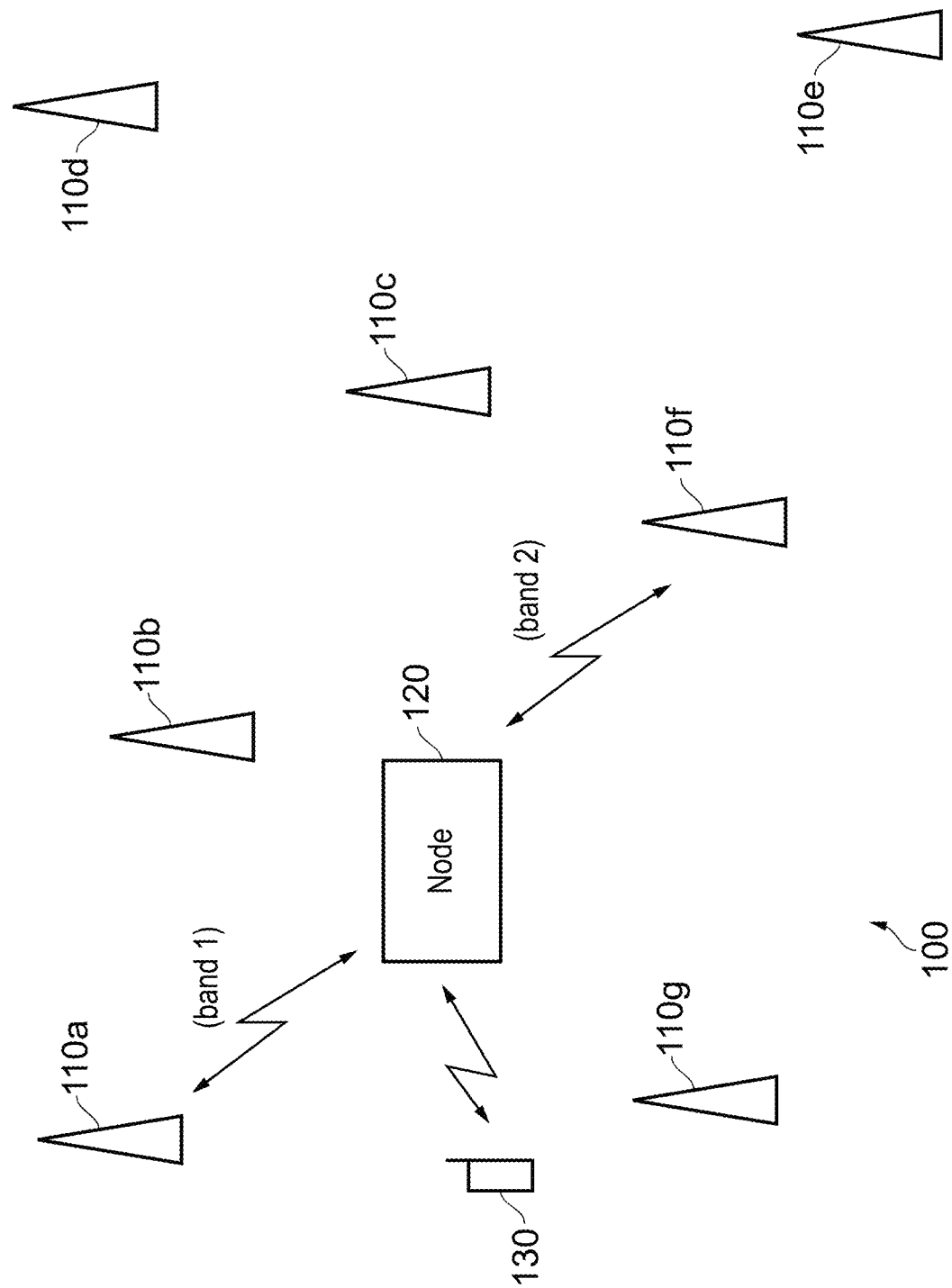

Before discussing the embodiments with reference to the accompanying figures, the following description of embodiments and associated advantages is provided.

In accordance with one example configuration there is provided a node comprising: radio circuitry adapted to wirelessly connect to other devices in a wireless network using either a first radio configuration or a second radio configuration; scan circuitry adapted to determine a first measurement related to using the radio circuitry to connect to an analysed device in the other devices in the first radio configuration and a second measurement related to using the radio circuitry to connect to the analysed device in the second radio configuration; metric calculation circuitry adapted to calculate, for each device in the other devices, a metric, wherein each metric is calculated by applying a first weighting greater than zero to the first measurement obtained for that device and a second weighting greater than zero to the second measurement obtained for that device; and selection circuitry adapted to select one of the other devices in dependence on the metric calculated for each of the other devices.

The radio circuitry is able to use either a first radio configuration or a second radio configuration. In some embodiments, the radio circuitry is able to use only one such configuration at a time and is capable of changing between the configurations. The scan circuitry determines a first measurement and a second measurement in relation to a device in the plurality of other devices. The first measurement relates to connecting to the analysed device in the first configuration and the second measurement relates to connecting to the analysed device in the second configuration. Note, however, that although these measurements might be made while the radio circuitry is in each of the first configuration and the second configuration, there is no need for the radio circuitry to actually enter these configurations in order to determine the measurements. A metric is calculated for each of the other devices (e.g. the candidates to which the node can connect). For a given node, the metric is established by applying a first weighting to the first measurement made in respect of the given node and by applying a second weighting to the second measurement made in respect of the given node. In some embodiments, the first weighting is 1. The weighted values can then be added together to provide the metric. The selection circuitry can then select one of the other devices based on the metric for each of the other devices. By determining a selection metric for each of the other devices (e.g. candidates) that considers both a first configuration and a second configuration, the metric takes into account an alternative configuration of the radio circuitry. This can result in the selection of a node that performs well in both the main configuration and the alternative configuration. Consequently, if the main configuration becomes unusable such that the alternative configuration must be used, the node that has already been selected should continue to perform well, thereby reducing the need to immediately perform the scanning process again.

In some embodiments, the first radio configuration is a first radio band; and the second radio configuration is a second radio band. Consequently, the selection of a node considers both a primary band at which the node operates and an alternative band. Hence, if the first band becomes unusable (e.g. due to interference or a signal becoming blocked) then the selected node should continue to provide good connectivity in the secondary (e.g. backup) band. A radio band can be defined by a frequency or a range of frequencies at which communication between the devices occurs.

In some embodiments, the first measurement and the second measurement are of the same type. In such embodiments, each of measurements is of the same thing but the conditions in which the measurements are made (e.g. the configurations of the radio circuitry) have changed. In some other embodiments, the first measurement and the second measurement are of different types. This may be appropriate where, for example, in the second configuration, a different metric to that used for the first configuration is a better indicator of a good quality connection.

In some embodiments, each of the first measurement and the second measurement comprise at least a first parameter and a second parameter. The first measurement and the second measurement can therefore consider a number of factors. For example, these factors might include RSRP, SINR (Signal to Interference and Noise Ratio), Spectral Efficiency (SE), and/or Rank Index (RI).

In some embodiments, the first parameter relates to a first radio characteristic of the analysed node; and the second parameter relates to a second radio characteristic of the analysed node compared to the second radio characteristic of inter-frequency or co-channel neighbours of the analysed node. The concept of dominance considers how one characteristic (e.g. a radio characteristic) for a node compares to the co-channel or inter-frequency neighbours of that node. This provides a relative comparison for a metric. For instance, if a node's RSRP value is 0.8 this gives a certain amount of information. However, it can be more useful to know that the node's RSRP value is 0.8 and the co-channel or inter-frequency neighbours of that node (other nodes that could interfere) have a total RSRP value of 0.3. In other words, the RSRP value of the node in question is relatively high compared to those neighbouring nodes that could interfere.

In some embodiments, each of the first measurement and the second measurement comprise at least a third parameter. Indeed, in some other embodiments, further parameters can also be provided.

There are a number of different possibilities for the third parameter. However, in some embodiments, the third parameter relates to a third radio characteristic of the analysed node.

In some embodiments, the first measurement is DRM of the analysed node while in the first radio configuration; and the second measurement is DRM of the analysed node while in the second radio configuration. The DeNodeB (donor eNodeB) Ranking Metric is a metric that can be used to rank the quality of particular donor eNodeBs (eNodeBs that can be connected to, to provide connectivity to a backhaul). The metric is made up from a combination of RSRP dominance, and at least one of spectral efficiency or SINR In some embodiments, the metric calculation circuitry is adapted to disregard the second measurement in response to the second measurement being below a threshold value. This can be achieved by subtracting a value from the second measurement and then taking the maximum of 0 or the adjusted second measurement. In this way, a particularly low value of the second measurement causes the second measurement to be disregarded entirely. Consequently, a metric for a device (e.g. donor node) cannot be boosted by a poor performing second measurement. This can help to prevent the situation in which the node intends to rely on the connection using the second configuration only to discover that the quality of connection provided by the selected device is poor or unusable.

In some embodiments, the radio circuitry is adapted to wirelessly connect to other devices in a wireless network using either a first radio configuration, a second radio configuration, or a third radio configuration; the scan circuitry is additionally adapted to determine a third measurement related to using the radio circuitry to connect to the analysed device in the third radio configuration; and each metric is calculated by applying a first weighting greater than zero to the first measurement, a second weighting greater than zero to the second measurement, and a third weighting greater than zero to the third measurement. Consequently, as well as considering a primary configuration and a secondary (e.g. backup) configuration for when the primary configuration is unusable, a third configuration can also be considered. The third configuration can be substantially different from the first and second configurations and could therefore represent an ultimate or final fall-back position.

In some embodiments, the third metric comprises at least one parameter from the list comprising channel quality and transmission speed. In general a higher quality channel allows for a greater bandwidth due to reducing the need for data to be retransmitted. Similarly, a greater transmission speed allows more data to be sent in a shorter time and can therefore reflect a greater bandwidth. In each case, such connections can be desirable.

In some embodiments, the third configuration enables the radio circuitry to communicate using Wi-Fi. For example, in some embodiments, the third configuration enables the radio circuitry to communicate using one or more of the IEEE 802.11 standards.

In some embodiments, the third metric is WRM. The Wi-Fi Ranking Metric (WRM) considers such parameters as channel quality and transmission speed. It could, for instance use RSSI instead of RSRP. In some embodiments, the WRM considers the maximum achieved modulation and coding scheme (MCS). Some embodiments consider the bandwidth usage based on Client Connection Quality (CCQ) and retry rates. Throughput rates could also be used.

In some embodiments, the metric calculation circuitry is adapted to disregard the third measurement in response to the third measurement being below a threshold value. This can be achieved by subtracting a value from the third measurement and then taking the maximum of 0 or the adjusted third measurement. In this way, a particularly low value of the third measurement causes the third measurement to be disregarded entirely. Consequently, a metric for a device (e.g. donor node) cannot be boosted by a poor performing third measurement. This can help to prevent the situation in which the node intends to rely on the connection using the third configuration only to discover that the quality of connection provided by the selected device is poor or unusable.

In some embodiments, the node comprises receiver circuitry to receive timing information; and the metric calculation circuitry is adapted to exclude measurements associated with configurations where the timing information cannot be received. In some hardware, it is important to be able to provide an accurate clock signal. Typically this is achieved by receiving an accurate clock signal, modifying the signal as appropriate, and then transmitted a new signal. However, it could be the case that such timing information can only be received when the receiver circuitry is in a particular configuration. Consequently, in these embodiments, if there is a configuration for which the timing information cannot be received then any measurement associated with that configuration will be disregarded.

There are a number of ways of providing the timing information. However, in some embodiments, the timing information is a GPS signal.

In some embodiments, the selection circuitry is adapted to select the one of the other devices having a highest value of the metric. For example, in the plurality of other devices, the one with the highest metric will be selected as the node to form a connection with using the radio circuitry.

In some embodiments, the node comprises an antenna; and rotation circuitry to rotate the antenna through a plurality of antenna positions to calculate the metric for each device in the other devices. Accordingly, the node is not limited to forming a connection with other devices that are accessible from a single antenna position. The antenna can therefore be rotated to determine the metric for each of the other devices that becomes accessible during the rotation. Once one of the other devices has been selected, the antenna can then be rotated to match the antenna rotation that was used when calculating the metric for that other device. In some other embodiments, electronic beam steering can be used in order to alter the direction in which an antenna points. Typically, this is achieved by connecting different elements of a circuit so that the array is more sensitive to receiving communications from a particular direction and can transmit communications in a particular direction more strongly.

Particular embodiments will now be described with reference to the figures.

FIG. 1 illustrates a wireless network 100 comprising a number of donor nodes 110a-110g. The donor nodes 110a-110g are connected to a network and thus can wirelessly provide access to a node 120. The donor nodes 110a-110g are scattered around such that regardless of the environment or obstacles, it is generally possible for the node 120 to establish a connection to at least one of the donor nodes 110a-110g. The node 120 itself also establishes wireless connections to items of end-user equipment 130 such as mobile devices such as computers etc. In FIG. 1, it is shown how a node 120 can connect to a first donor node 110a using a first band and can connect to a second donor node 110f using a second band. One of these bands may be a preferred band due to its improved bandwidth, or signal quality for example.

Figure 2:
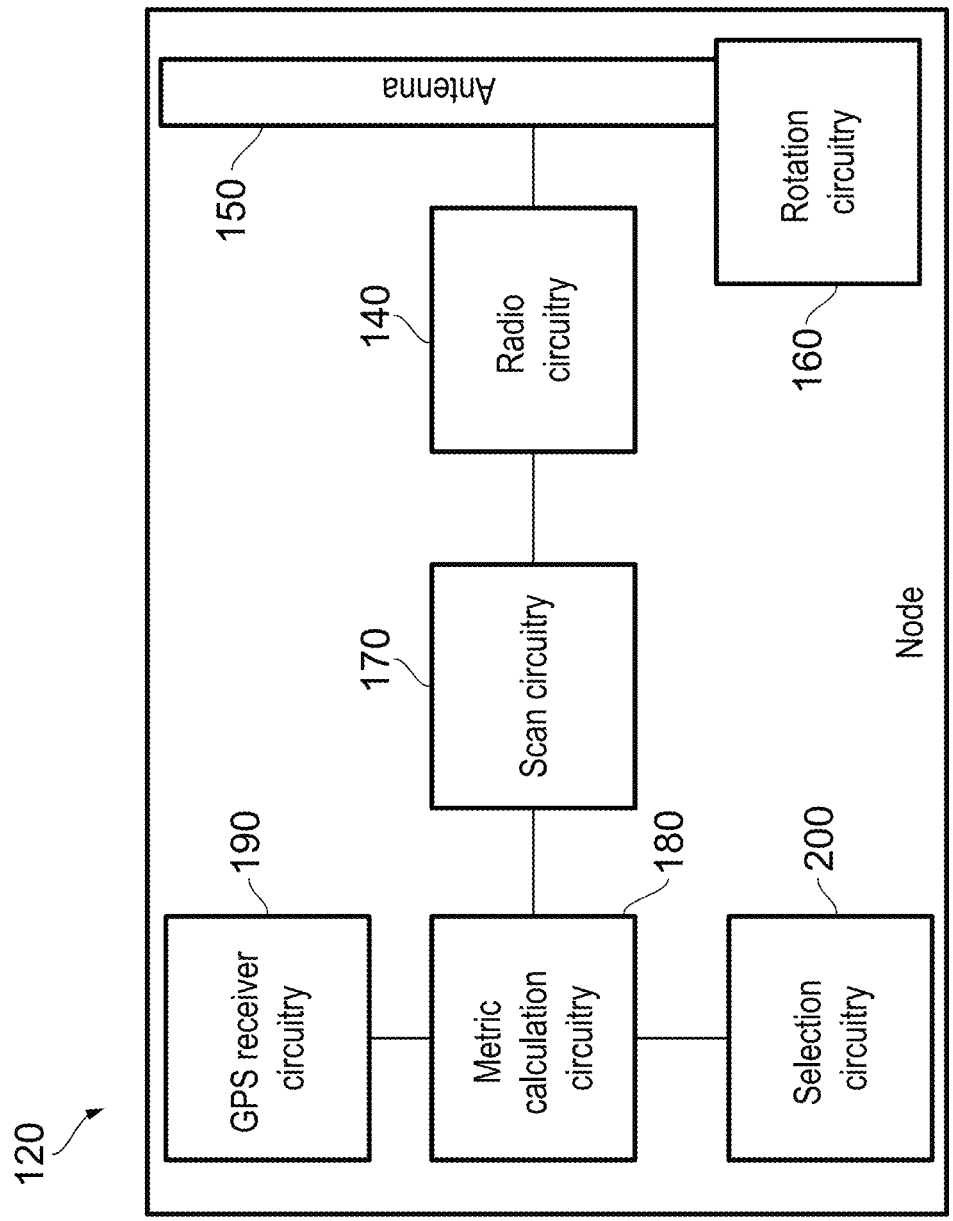

FIG. 2 schematically illustrates the node 120 in more detail. The node contains radio circuitry 140, which is used to communicate with other devices in the wireless network 100, such as donor nodes 110a-110g. The radio circuitry is capable of operating in at least a first configuration and a second configuration. In this example, the first configuration relates to the first frequency band and the second configuration relates to the second frequency band. The radio circuitry 140 can switch between these configurations/bands as required, but can only use one such configuration at a time. The radio circuitry 140 performs the communication via an antenna 150, which is rotated using rotation circuitry 160. In this way, the radio circuitry 140 is able to increase the range of donor nodes 110a-110g that can be accessed beyond what would be possible with a static antenna. The scan circuitry 170 makes a number of measurements in relation to each of the other devices (e.g. donor nodes 110a-110g) that are detected. In this embodiment, each of the measurements is a measurement of the DRM for that particular donor node. The calculation of DRM is shown with respect to FIG. 3. Metric calculation circuitry 180 is used to calculate a metric for a given donor node. This is achieved by applying a weighting to each of the first measurement and the second measurement. The calculation of the metric is shown with respect to FIG. 4. The calculation of the metric by the metric calculation circuitry 180 can be affected by whether or not it is possible to establish a GPS lock and thereby receive timing information from the GPS signal. GPS receiver circuitry 190 is provided in order to attempt to receive the GPS signal. The selection circuitry 200 then selects the donor node 110a-110g having the highest metric. In addition, if necessary, the selection circuitry 200 will cause the rotation circuitry 160 to rotate the antenna 150 to the angle at which the metric was calculated for the selected donor node.

FIG. 3 shows a worked example of calculating DRM. DRM works by considering one or more independent metrics such as SINR, Spectral Efficiency (SE), and RSRP dominance. The RSRP dominance is calculated by finding the power difference between a particular donor node and the sum of its neighbours powers and the RSRP detection noise floor. This difference is then converted into a dB value. The detection noise floor can be calculated using the method outlined in http://laroccasolutions.com/78-rsrp-and-rsrq-measurement-in-lte and is given by: KTB+NF where NF=7 dB being the noise figure for the communication system, K its Boltzmann's constant, T is the thermal noise floor, and B is 15 KHz being the bandwidth of a resource element.

As well as using the SINR/SE and RSRP dominance, it is also possible to incorporate a third metric such as downlink and uplink throughputs.

The metrics taken are aggregated over a period of time. For example, the SINR/SE/CINR/RSRP dominance values can be averaged (via a mean) every five seconds for one minute. This allows anomalies in the measurements to be evened out or exaggerated (if, for example, a connection were to be detected as being highly variable). A moving average can be calculated by the equation y[n]=alpha*x[n]+(1−alpha)*y[n−1]. This can be used to treat more recent values with a greater importance than older values (or vice-versa). The value of alpha can be determined by the equation:

$$\alpha = 1 - (1 - \text{settling\_level})^{\frac{1}{num\_samples}}$$

The number of samples (num_samples) is calculated by dividing the averaging period by the sampling resolution. For example, if samples are taken every five seconds for one minute, then 20 samples are taken. The settling level (settling_level) is the filter output level after num_samples for a step input.

Each of these averaged metrics is then normalised to within a range of 0 to 1 based on maximum and minimum values of the metrics for the equipment being used. For example, for SINR, the minimum and maximum values could be −5 dB and 30 dB respectively. Meanwhile, the minimum and maximum values for RSRP dominance could be 0 and 35 (dBs) respectively.

The normalised values are then weighted by modifiers, again in the range 0 to 1 before being added together to form the DRM value. The modifiers can be configured depending on the network deployment strategy. In particular, the modifiers depend on whether the wireless network operator considers SINR/SE or RSRP dominance to be the more important metric. In the current embodiments, the weighting value attached to the RSRP dominance is equal to 1 minus the weighting value for the SINR/SE. This way, the DRM value will lie between 0 and 1. In the example of FIG. 3, the SINR weighting is 0.3 and the RSRP weighting is 0.7. Thus, RSRP is considered to be a more important factor than SINR.

Figure 4:
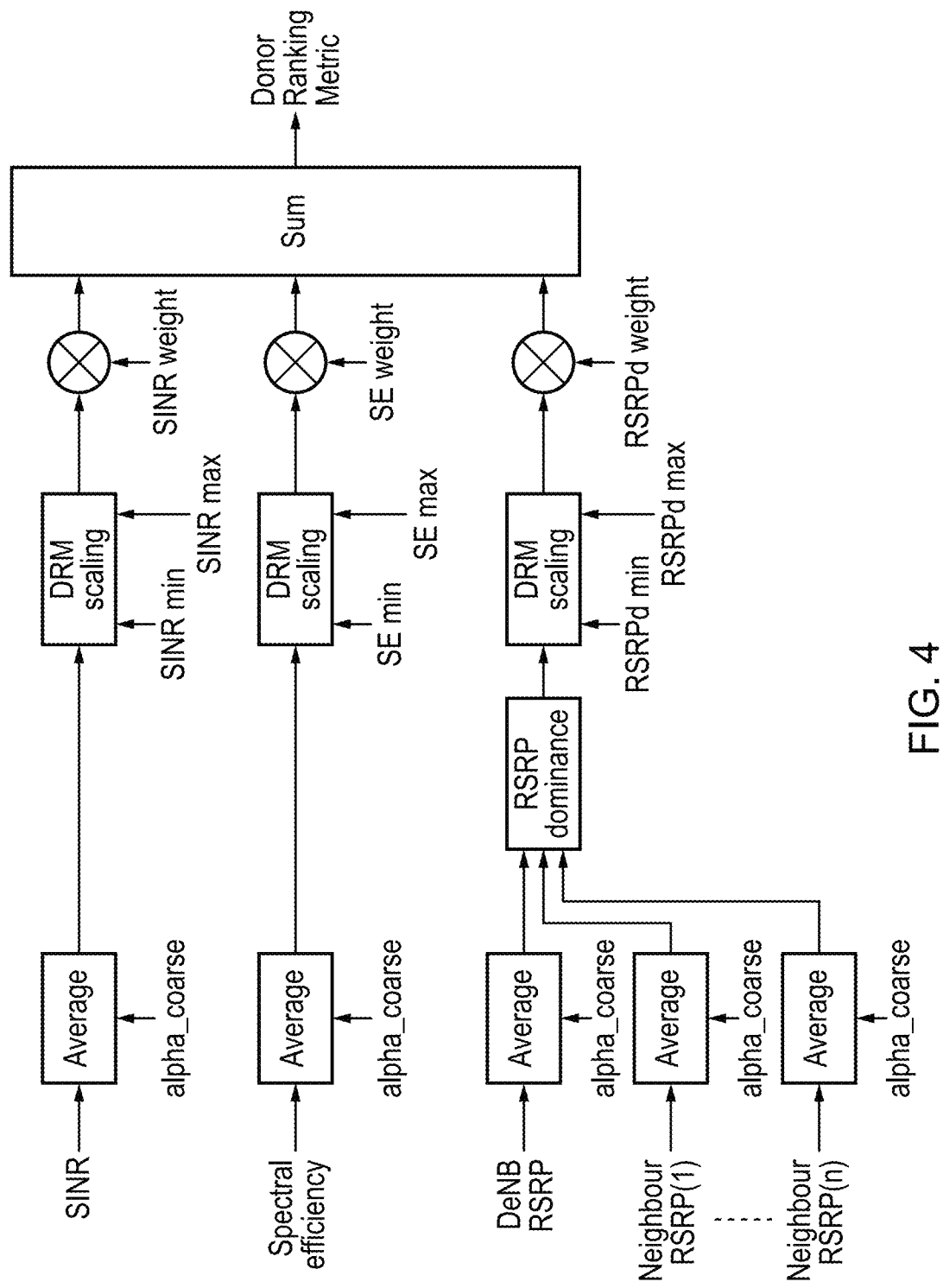
FIG. 4 shows a flow of data that indicates how DRM can be calculated in accordance with some embodiments.

FIG. 4 shows a flow of data that indicates how DRM can be calculated. The first component first considers RSRP dominance, which is again made up from the RSRP value averaged over a period of time, as well as the RSRP values of neighbours of that node, again averaged over a period of time. The averaging period for coarse alignment (represented by alpha coarse) is different compared to the averaging period for fine alignment. An example value for alpha coarse is 0.2421 assuming a 75% settling level, an averaging duration of five seconds and a one second sampling duration. Having calculated the dominance value, this is normalised/scaled based on minimum and maximum values of RSRP dominance and then weighted. Similarly, spectral efficiency and SINR are both averaged over a period of time (represented by alpha_coarse) and normalised/scaled based on minimum and maximum values of spectral efficiency/SINR respectively. These values are then each weighted. The weighted, normalised values of SINR, Spectral Efficiency, and RSRP dominance are then added together to form DRM. In this embodiment, DRM is made up from three components. However, in other embodiments, only one of Spectral Efficiency and SINR could be used.

Where the radio operates in two configurations (e.g. with two different frequency bands) the metric can be expressed by the formula:

DRM(Node $X$ while in configuration 1)*FirstConfigurationWeighting+(MAXIMUM(0,DRM (Node $X$ while in configuration 2)−MinDRMOffset))* SecondConfigurationWeighting*GPSDetection Where:

DRM( ) is the DRM (as discussed above) for a particular node.

FirstConfigurationWeighting is a weighting for the measurement associated with the first configuration. For example, this is often 1.

MinDRMOffset is a value that would result in a high quality backhaul so that nodes that operate poorly in the $2^{nd}$ (non-primary) configuration are not overlooked.

SecondConfigurationWeighting is the weighting for the $2^{nd}$ configuration.

GPSDetection is a binary value (0 or 1) that indicates whether a GPS lock can be established (0=no, 1=yes).

Where the radio operates in three configurations (e.g. with two different frequency bands or Wi-Fi) the metric can be expressed by the formula:

DRM(Node $X$ while in configuration 1)*FirstConfigurationWeighting+(MAXIMUM(0,DRM (Node $X$ while in configuration 2)−MinDRMOffset))* SecondConfigurationWeighting*GPSDetection+ (MAXIMUM (0,DRM(Node $X$ while in configuration 3)−MinWRMOffset))* WiFiConfigurationWeighting*GPSDetection Where:

DRM( ) is the DRM (as discussed above) for a particular node.

FirstConfigurationWeighting is a weighting for the measurement associated with the first configuration. For example, this is often 1.

MinDRMOffset is a value that would result in a high quality backhaul so that nodes that operate poorly in the $2^{nd}$ (non-primary) configuration are not overlooked.

SecondConfigurationWeighting is the weighting for the $2^{nd}$ configuration.

MinWRMOffset is analogous to MinDRMOffset.

WiFiConfigurationWeighting is analogous to SecondConfigurationWeighting.

GPSDetection is a binary value (0 or 1) that indicates whether a GPS lock can be established (0=no, 1=yes).

The use of the GPSDetection flag can be more important for Wi-Fi because it is less likely that it is possible to get timing information from a Wi-Fi access point. Accordingly, if a GPS lock cannot be established (in order to obtain GPS timing information) it is less acceptable to establish a connection using Wi-Fi.

FIG. 5 shows a worked example for the calculation of the metric. In FIG. 5, each angle of the antenna is shown. It is assumed, in this example, that at each angle, a different donor node becomes contactable. This example also only considers two frequency band. The skilled person will appreciate that the metric can be generalised to any number of configurations (e.g. bands) as described in the above equations.

Of particular node in this example, the node detected at angle 110 degrees has its DRM measurement in the second configuration ignored. This is because the score is so low (0.1) that it is below the score necessary to obtain a good connection (MinDRMOffset=0.4). Consequently, this measurement is not taken into account at all. This prevents a score being boosted by a small amount because of an unusable connection. For this reason, the node detected at angle 110 degrees scores slightly higher, despite having a lower measurement in the primary configuration (band 1 DRM). This is because although its measurement in the first configuration is lower, it has a usable connection in the second configuration, which although not great, is still better than the quality of the connection in the second configuration for the node at 110, which is considered to be unusable, being below MinDRMOffset.

In a similar manner, the node detected at angle 50 degrees has a higher overall metric than the node at angle 220 degrees. Even though the node at angle 50 degrees has a lower DRM score in the first configuration, it has a much higher DRM score in the second configuration, and so represents a better overall node. This is because if the first configuration fails, the node can still operate well in the second configuration, and hence a re-scan might be avoided.

These two examples consider cases where GPSDetection=1, i.e. where a GPS lock can be obtained, and hence timing information can be gathered from a GPS signal. In the example of the node detected at angle 355 degrees, no GPS lock can be obtained. Because of this, only the first measurement (the DRM score in the first configuration) is considered. Therefore, even though this node has a very high score for the second configuration, this does not affect the overall metric. This could be because in the second configuration it is not possible or not desirable to obtain timing information. For example, the second configuration could represent the use of a frequency band used by hardware that is unable to provide accurate timing information.

Accordingly, it can be seen that by considering at least two configurations for the radio circuitry, the metric is able to consider both the current connection possibilities, and those connection possibilities that might have to be used in the event that the first configuration becomes unusable. This results in the selection of a donor node that will provide good connectivity in a variety of circumstances and thus one where a connection could be maintained without needing a rescan to determine an alternative donor node to use.

Figure 6:
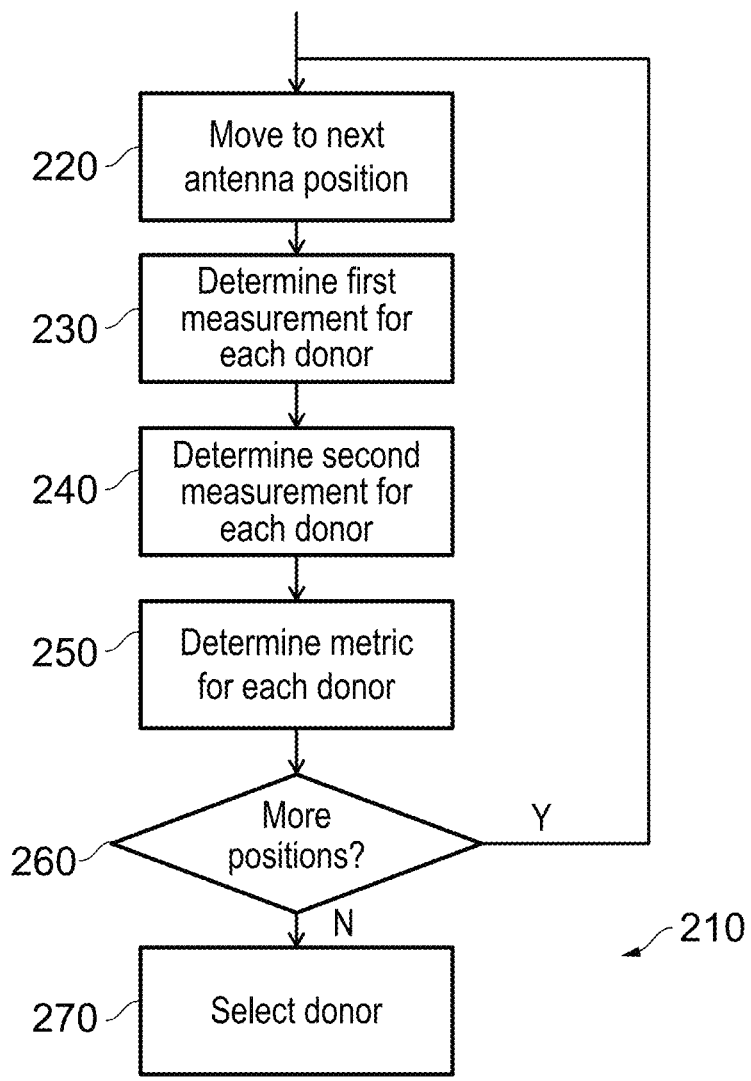
FIG. 6 shows a method in accordance with some embodiments in the form of a flowchart.

FIG. 6 shows a method in accordance with some embodiments in the form of a flowchart 210. At a step 220, the antenna is rotated to the next position. At step 230, a first measurement is obtained for each donor node. At a step 240, a second measurement is obtained for each donor node. At step 250, a metric is obtained for each donor node. At step 260, it is determined if there are more positions for the rotation of the antenna. If so, then the process returns to step 220 where the antenna is rotated to the next antenna position. If not, then the process moves on to step 270 where one of the donors is selected. In particular, the selected donor node will correspond to the node with the highest metric. If necessary, the antenna will be rotated to the position at which that highest metric was obtained.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A node comprising:
   radio circuitry adapted to wirelessly connect to other devices in a wireless network using either a first radio configuration or a second radio configuration;
   scan circuitry adapted to determine a first measurement related to using the radio circuitry to connect to an analysed device, of the other devices, using the first radio configuration and a second measurement related to using the radio circuitry to connect to the analysed device using the second radio configuration;
   metric calculation circuitry adapted to calculate, for each device in the other devices, a metric, wherein each metric is calculated by adding:
      a first value obtained by multiplying a first weighting greater than zero by the first measurement obtained for that device using the first radio configuration; and
      a second value obtained by multiplying a second weighting greater than zero by the second measurement obtained for that device using the second radio configuration, the second weighting being different than the first weighting; and
   selection circuitry adapted to select one of the other devices in dependence on the metric calculated for each of the other devices.

2. A node according to claim 1, wherein
the first radio configuration is a first radio band; and
the second radio configuration is a second radio band.

3. A node according to claim 1, wherein
the first measurement and the second measurement are of the same type.

4. A node according to claim 1, wherein
each of the first measurement and the second measurement comprise at least a first parameter and a second parameter.

5. A node according to claim 4, wherein
the first parameter relates to a first radio characteristic of the analysed device; and
the second parameter relates to a second radio characteristic of the analysed device compared to the second radio characteristic of inter-frequency or co-channel neighbours of the analysed device.

6. A node according to claim 4, wherein
each of the first measurement and the second measurement comprise at least a third parameter.

7. A node according to claim 6, wherein
the third parameter relates to a third radio characteristic of the analysed device.

8. A node according to claim 2, wherein
the first measurement is DRM of the analysed device while in the first radio configuration; and
the second measurement is DRM of the analysed device while in the second radio configuration.

9. A node according to claim 1, wherein
the metric calculation circuitry is adapted to disregard the second measurement in response to the second measurement being below a threshold value.

10. A node according to claim 1, wherein
the radio circuitry is adapted to wirelessly connect to other devices in a wireless network using either a first radio configuration, a second radio configuration, or a third radio configuration;
the scan circuitry is additionally adapted to determine a third measurement related to using the radio circuitry to connect to the analysed device in the third radio configuration; and
each metric is calculated by applying a first weighting greater than zero to the first measurement, a second weighting greater than zero to the second measurement, and a third weighting greater than zero to the third measurement.

11. A node according to claim 10, wherein
the third measurement comprises at least one parameter from a list comprising channel quality and transmission speed.

12. A node according to claim 10, wherein
the third radio configuration enables the radio circuitry to communicate using Wi-Fi.

13. A node according to claim 12, wherein
the third measurement includes a Wi-fi Ranking Metric (WRM).

14. A node according to claim 10, wherein
the metric calculation circuitry is adapted to disregard the third measurement in response to the third measurement being below a threshold value.

15. A node according to claim 1, comprising:
receiver circuitry to receive timing information; and
the metric calculation circuitry is adapted to exclude measurements associated with configurations where the timing information cannot be received.

16. A node according to claim 15, wherein
the timing information is a Global Positioning System (GPS) signal.

17. A node according to claim 1, wherein
the selection circuitry is adapted to select the one of the other devices having a highest value of the metric.

18. A node according to claim 1, comprising:
an antenna; and
rotation circuitry to rotate the antenna through a plurality of antenna positions to calculate the metric for each device in the other devices.

19. A method comprising:
wirelessly connecting to other devices in a wireless network using either a first radio configuration or a second radio configuration;
determining a first measurement related to connecting to an analysed device, of the other devices, using the first radio configuration and a second measurement related to connecting to analysed device using the second radio configuration;
calculating, for each device in the other devices, a metric, by adding:
a first value obtained by multiplying a first weighting greater than zero by the first measurement obtained for that device using the first radio configuration; and
a second value obtained by multiplying a second weighting greater than zero by the second measurement obtained for that device using the second radio configuration, the second weighting being different than the first weighting; and
selecting one of the other devices in dependence on the metric calculated for each of the other devices.

20. A node comprising:
means for wirelessly connecting to other devices in a wireless network using either a first radio configuration or a second radio configuration;
means for determining a first measurement related to connecting to an analysed device, of the other devices, using the first radio configuration and a second measurement related to connecting to the analysed device using the second radio configuration;
means for calculating, for each device in the other devices, a metric, by adding:
a first value obtained by multiplying a first weighting greater than zero by the first measurement obtained for that device using the first radio configuration; and
a second value obtained by multiplying a second weighting greater than zero by the second measurement obtained for that device using the second radio configuration, the second weighting being different than the first weighting; and
means for selecting one of the other devices in dependence on the metric calculated for each of the other devices.

* * * * *

UNITED STATES PATENT AND TRADEMARK OFFICE
CERTIFICATE OF CORRECTION

| | | |
|---|---|---|
| PATENT NO. | : 10,771,992 B2 | Page 1 of 1 |
| APPLICATION NO. | : 16/122543 | |
| DATED | : September 8, 2020 | |
| INVENTOR(S) | : Kevin Andrew Terry, Anthony Edward Putman and Alan Carter | |

It is certified that error appears in the above-identified patent and that said Letters Patent is hereby corrected as shown below:

On the Title Page

At (73), Assignee(s):
Insert --AIRSPAN NETWORKS INC.--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*